(12) United States Patent
Morioka et al.

(10) Patent No.: US 9,001,713 B2
(45) Date of Patent: Apr. 7, 2015

(54) COMMUNICATION APPARATUS AND COMMUNICATION METHOD, COMPUTER PROGRAM, AND COMMUNICATION SYSTEM

(75) Inventors: Yuichi Morioka, Tokyo (JP); Hiroaki Takano, Saitama (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 13/266,754

(22) PCT Filed: Apr. 19, 2010

(86) PCT No.: PCT/JP2010/056917
§ 371 (c)(1),
(2), (4) Date: Oct. 27, 2011

(87) PCT Pub. No.: WO2010/128619
PCT Pub. Date: Nov. 11, 2010

(65) Prior Publication Data
US 2012/0044900 A1    Feb. 23, 2012

(30) Foreign Application Priority Data

May 8, 2009 (JP) ............................. P2009-113865
Sep. 11, 2009 (JP) ............................. P2009-210136

(51) Int. Cl.
H04B 3/20 (2006.01)
H04B 7/06 (2006.01)
H04B 7/08 (2006.01)

(52) U.S. Cl.
CPC ............ *H04B 7/0697* (2013.01); *H04B 7/0617* (2013.01); *H04B 7/0851* (2013.01)

(58) Field of Classification Search
CPC ........... H04L 2025/03006–2025/03426; H04L 27/2655–27/2695; H04L 27/2613
USPC ................ 370/276–278, 282, 286, 292, 310, 370/328–329, 431, 445–448
See application file for complete search history.

(56) References Cited

U.S. PATENT DOCUMENTS

2005/0002355 A1* 1/2005 Takano .................... 370/329
2006/0268671 A1* 11/2006 Coon ....................... 370/203

(Continued)

FOREIGN PATENT DOCUMENTS

| CN | 101627657 A | 1/2010 |
| JP | 2004-328570 | 11/2004 |
| JP | 2006-157388 | 6/2006 |

(Continued)

OTHER PUBLICATIONS

International Search Report from the Japanese Patent Office for International Application No. PCT/JP2010/056917, mailing date Jun. 1, 2010.

*Primary Examiner* — Michael Thier
*Assistant Examiner* — Eric Myers
(74) *Attorney, Agent, or Firm* — Sony Corporation

(57) ABSTRACT

A learning on a weight of an adaptive array antenna which becomes necessary for a space division multiple access is carried out while a backward compatibility with a conventional standard is maintained.
When a TRQ frame and a training frame for the learning are exchanged, a spoof is applied on these frames to preferably avoid collisions with a surrounding station STA4 that follows a conventional standard. Also, after the weight of the adaptive array antenna is learnt, a STA0 multiplexes and transmits the plurality of data frames addressed to a plurality of users while a wireless resource on a spatial axis is shared by the plurality of users, so that a throughput for one-to-many, that is, for the plurality of users as a whole is improved.

14 Claims, 8 Drawing Sheets

(56) References Cited

U.S. PATENT DOCUMENTS

2009/0109936 A1* 4/2009 Nagai ........................... 370/336
2011/0299514 A1* 12/2011 Kwon ........................... 370/338
2012/0127899 A1* 5/2012 Ketchum et al. ............. 370/310

FOREIGN PATENT DOCUMENTS

| | | |
|---|---|---|
| JP | 2008-193207 | 8/2008 |
| JP | 2008-252867 | 10/2008 |
| WO | WO 2008/111496 A2 | 9/2008 |

* cited by examiner

COMMUNICATION APPARATUS AND COMMUNICATION METHOD, COMPUTER PROGRAM, AND COMMUNICATION SYSTEM

TECHNICAL FIELD

The present invention relates to a communication apparatus and a communication method, a computer program, and a communication system to which a space division multiple access (Space Division Multiple Access: SDMA) where a wireless resource on a spatial axis is shared by a plurality of users is applied and particularly relates to a communication apparatus and a communication method, a computer program, and a communication system in which a communication operation is carried out in conformity to a new standard to which the space division multiple access is applied while maintaining a backward compatibility with a conventional standard to which the space division multiple access is not applied.

BACKGROUND ART

A wireless communication eliminates the burden of wiring operations in a traditional wired communication and further serves for a utilization as a technology for realizing a mobile communication. For example, as a regular standard with regard to a wireless LAN (Local Area Network), IEEE (The Institute of Electrical and Electronics Engineers) 802.11 can be exemplified. IEEE802.11a/g has been already widely spread.

In many wireless LAN systems including IEEE802.11, while an access control procedure based on a carrier sense such as CSMA/CA (Carrier Sense Multiple Access with Collision Avoidance) is adopted, respective communication stations are set to avoid collisions of carriers at a time of random channel access. That is, a communication station in which a transmission request is generated first monitors a media state for a predetermined inter frame space DIFS (Distributed Inter Frame Space), performs random back-off if a transmission signal does not exist during this period, and obtains a transmission right and can transmit a frame in a case where the transmission signal does not exist further during this period too. Also, when a frame with a high degree of urgency such as ACK is to be exceptionally transmitted, the communication station is allowed to transmit a frame after a shorter inter frame space SIFS (Short Inter Frame Space). According to this, the frame with the high degree of urgency can be transmitted ahead of a frame that is transmitted in accordance with a normal CSMA procedure.

Also, in the wireless communication, it is known that a hidden terminal problem occurs in which an area exists where the communication stations cannot mutually communicate directly. As mutual hidden terminals cannot perform a negotiation, a possibility exists that transmission operations may collide with each other. As a methodology for solving the hidden terminal problem, "virtual carrier sense" can be exemplified. To be specific, in a case where Duration (duration time) information for reserving media is described in a reception frame whose destination is not the local station, the communication station expects that the media is used during a period in accordance with the Duration information, that is, performs the virtual carrier sense and sets a transmission stop period (NAV: Network Allocation Vector).

As a representative example of a signal transmission reception sequence utilizing the virtual carrier sense, RTS/CTS handshake can be exemplified. A communication station at a data transmission source transmits a transmission request frame (RTS: Request To Send), and a data transmission is started in response to a reception of a confirmation notification frame (CTS: Clear To Send) from a data transmission destination. Then, when the hidden terminal receives at least one of the frames RTS and CTS whose destination is not the local station, the transmission stop period is set on the basis of the Duration information described in the reception frame to avoid the collisions. By using the RTS/CTS handshake in combination with the CSMA/CA control procedure, reduction in overhead of the collisions in an overloaded state may be realized in some cases.

Also, according to the standard of IEEE802.11a/g, in a 2.4 GHz band or 5 GHz band frequency, by utilizing an orthogonal frequency division multiplexing (Orthogonal Frequency Division Multiplexing: OFDM), a modulation method that achieves a communication speed of 54 Mbps at maximum (physical layer data rate) is supported. In IEEE802.11n that is an extended standard, a further higher bit rate is realized by adopting an MIMO (Multi-Input Multi-Output) communication system. Herein, MIMO refers to a communication system provided with a plurality of antenna elements on both a transmitter side and a receiver side for realizing spatially multiplexed streams (widely known).

IEEE802.11n maintains a backward compatibility with IEEE802.11a/g. For example, in a frame format of IEEE802.11n, a method of spoofing a signal information (L-SIG) field where a header section guarantees the backward compatibility is adopted. To be specific, spoofed frame length information and transmission rate information are described in the signal information (L-SIG), and a legacy communication terminal compliant with IEEE802.11a/g is caused to recognize that the frames continue during a period until a frame exchange sequence having no backward compatibility is completed and stand by for a transmission operation to avoid the collisions. On the other hand, with respect to a communication terminal compliant with IEEE802.11n, it is indicated that L-SIG is spoofed by switching a signal arrangement of a part of a signal information (HT-SIG) field where the backward compatibility of the header section is not guaranteed. Therefore, a high speed communication terminal compliant with IEEE802.11n obtains correct Duration information based on a decoding result of HT-SIG and can perform an appropriate virtual carrier sense (for example, see PTL 1).

Although a high throughput (High Throughput: HT) above 100 Mbps can be achieved by IEEE802.11n, along with an increase in the information amount of transmission contents, realization of a further higher speed is demanded. For example, as the number of antennas in the MIMO communication device is increased and the number of streams to be spatially multiplexed is increased, it is possible to improve the throughput in a one-to-one communication while the backward compatibility is maintained.

In future, an improvement in the throughput for the plurality of users as a whole is demanded in addition to the throughput per user in the communication. For example, the working group for IEEE802.11ac aims to establish a wireless LAN standard in which a frequency band smaller than or equal to 6 GHz is used and a data transmission speed exceeds 1 Gbps, and for the realization, like multi user MIMO (MU-MIMO) or SDMA (Space Division Multiple Access), a space division multiple access system where a wireless resource on a spatial axis is shared by a plurality of users is potent.

At present, the space division multiple access is under review as one of fundamental technologies for a next generation mobile phone series system based on a time division multiple access (Time Division Multiple Access: TDMA)

such as PHS (Personal Handyphone System) or LTE (Long Term Evolution). Also, in a wireless LAN field, a one-to-many communication is being paid attention as described above, but an application example is rarely met. This is probably because it is difficult to efficiently multiplex the plurality of users in the frame communication.

Also, when an operation of the space division multiple access is started by the new wireless LAN standard, as a communication device of the relevant new standard needs to operate under a communication environment where a communication device of the conventional standard exists in a mixed manner, it is necessary to sufficiently take the backward compatibility with the conventional standard into account.

For example, when the communication device compliant with the new standard transmits frames to a plurality of communication partners at the same time by applying the space division multiple access, the hidden terminal that contains at least one of the communication stations at the transmission source and the transmission destination of the relevant frame in a communication range refrains from a transmission operation over a period until the series of frame exchange sequence is ended even when a multiplexed signal cannot be decoded as not being compliant with the new standard and needs to avoid collisions of transmission signals.

According to the conventional IEEE802.11, a mechanism of the carrier sense such as CSMA/CA and RTS/CTS is introduced. Therefore, in the new standard such as IEEE802.11ac, it is necessary to preferably combine the carrier sense with the space division multiple access.

For example, a communication system is proposed in which two technologies of the carrier sense in the conventional IEEE802.11 and the space division multiple access by an adaptive array antenna are combined with each other by using the RTS, CTS, and ACK frames composed of a frame format that maintains backward compatibility with the conventional IEEE802.11 (for example, see PTL 2).

Also, the communication station can perform the space division multiple access as the plurality of antenna elements function as the adaptive array antenna, but for that, it is necessary to previously perform the learning on the weight of the adaptive array antenna. For example, the communication station can learn the weight of the adaptive array antenna by obtaining it from the training signal that is received from each of the plurality of communication partners. Alternatively, by using a predetermined adaptation algorithm such as RLS (Recursive Least Square) with respect to the training signal, it is possible to directly carry out the learning on the weight of the adaptive array antenna (for example, see PTL 2).

In either method, the communication station that performs the learning on the weight of the adaptive array antenna needs each of the communication partners to send the training signal. Also, under the communication environment where the communication apparatuses that only follow the conventional standard exist in a mixed manner, similarly as in a state in which the normal frame exchange sequence needs to be carried out while avoiding the collisions of the carriers, the training signal needs to be transmitted while avoiding the interference by the communication apparatuses that only follow the conventional standard. That is, it is necessary to learn the weight of the adaptive array antenna while the backward compatibility with the conventional standard is maintained.

CITATION LIST

Patent Literature

PTL 1: Japanese Unexamined Patent Application Publication No. 2008-252867
PTL 2: Japanese Unexamined Patent Application Publication No. 2004-328570

SUMMARY OF INVENTION

Technical Problem

An object of the present invention is to provide an excellent communication apparatus and a communication method, a computer program, and a communication system in which it is possible to preferably carry out a communication operation by applying a space division multiple access where a wireless resource on a spatial axis is shared by a plurality of users.

A further object of the present invention is to provide an excellent communication apparatus and a communication method, a computer program, and a communication system in which it is possible to preferably carry out a communication operation in conformity to a new standard to which the space division multiple access is applied while the backward compatibility with the conventional standard to which the space division multiple access is not applied is maintained.

A further object of the present invention is to provide an excellent communication apparatus and a communication method, a computer program, and a communication system in which it is possible to learn a weight of an adaptive array antenna that is necessary to the space division multiple access while the backward compatibility with the conventional standard is maintained.

Solution to Problem

The present application has been made by taking the above-mentioned problem into account, and the invention described in claim 1 is a communication apparatus including:

an antenna element;

a communication unit that performs a transmission and reception processing of a wireless signal by using the antenna element; and a data processing unit that processes data transmitted and received in the communication unit, in which the data processing unit generates a training frame composed of a first field described while following a first communication standard with a downward compatibility and a second field including a training signal for a communication partner provided with a plurality of antenna elements to learn a weight of an adaptive array antenna to be transmitted from the communication unit.

According to the invention described in claim 2 of the present application, the training signal transmitted from the communication apparatus according to claim 1 is composed of a unique known sequence allocated to the communication apparatus.

According to the invention described in claim 3 of the present application, the first communication standard is equivalent to IEEE802.11, the first field of the training frame includes up to an L-SIG field, and the second field is composed of a training signal added in a rear of the L-SIG field. Also, the data processing unit of the communication apparatus according to claim 1 is configured to describe spoofed information in which a data length÷a transmission rate represents a length up to a trailing end of a unit of a communication sequence with the communication partner in Length and Rate of the L-SIG field.

According to the invention described in claim 4 of the present application, the data processing unit of the communication apparatus according to claim 3 is configured to describe a state in which the second field follows the first field in the L-SIG field.

According to the invention described in claim 5 of the present application, the first field of the training frame is equivalent to a data frame regulated by IEEE802.11 of the first communication standard, and the second field is composed of a training signal added in a rear of the data frame. Also, the data processing unit of the communication apparatus according to claim 1 spoofs Length in an L-SIG into information representing up to the trailing end of the data frame as a data length of a payload section of the training frame.

According to the invention described in claim 6 of the present application, the data processing unit of the communication apparatus according to claim 1 is set to provide a no-transmission interval for separating a trailing end of the first field of the training frame according to claim 5 from a beginning of the second field.

According to the invention described in claim 7 of the present application, the data processing unit of the communication apparatus according to claim 4 is configured to spoof Length in the L-SIG field into information representing up to a trailing end of the first field as the data length of the payload section of the training frame.

According to the invention described in claim 8 of the present application, the first field of the training frame is equivalent to the data frame regulated by IEEE802.11 of the first communication standard, and the second field is composed of training signals multiplexed on the payload section of the data frame.

Also, the invention described in claim 9 of the present application is a communication method of transmitting a training frame to a communication partner provided with a plurality of antenna elements, the communication method including:

a step of transmitting a first field described while following a first communication standard having a downward compatibility among the training frame; and a step of transmitting a second field including a training signal for the communication partner to learn a weight of an adaptive array antenna among the training frame.

Also, the invention described in claim 10 of the present application is a computer program described in a computer-readable format for executing a processing for transmitting a training frame to a communication partner provided with a plurality of antenna elements on a computer, the computer program causing the computer to function as:

a data processing unit that generates a training frame composed of a first field described while following a first communication standard having a downward compatibility and a second field including a training signal for the communication partner provided with the plurality of antenna elements to learn a weight of an adaptive array antenna.

The computer program according to the invention described in claim 10 of the present application defines a computer program described in the computer-readable format so that the predetermined processing is realized on the computer. In other words, by installing the computer program according to claim 10 of the present application into the computer, the cooperative actions are exhibited on the computer, and it is possible to obtain action effects similar to the communication apparatus according to claim 1 of the present application.

Also, the invention described in claim 11 of the present application is a communication system including:

a first communication apparatus including a plurality of antenna elements, a communication unit that performs a transmission and reception processing of a wireless signal by using the plurality of antenna elements, and a data processing unit that processes data transmitted and received in the communication unit; and a plurality of second communication apparatuses that simultaneously transmit training frames including a training signal for learning a weight of an adaptive array antenna with regard to the plurality of antenna elements to the first communication apparatus, in which each of the plurality of second communication apparatuses transmits the training frame composed of a first field described while following a first communication standard having a rank compatibility and a second field including a training signal for the communication partner provided with the plurality of antenna elements to learn the weight of the adaptive array antenna.

It should be however noted that the "system" referred herein refers to an object where a plurality of apparatuses (or function modules that realize particular functions) are logically congregated, and whether or not the respective apparatuses and function modules are in a single casing does not particularly matter.

Advantageous Effects of Invention

According to the present invention, it is possible to provide the excellent communication apparatus and the communication method, the computer program, and the communication system in which it is possible to preferably carry out the communication operation by applying the space division multiple access where the wireless resource on the spatial axis is shared by the plurality of users.

Also, according to the present invention, it is possible to provide the excellent communication apparatus and the communication method, the computer program, and the communication system in which it is possible to preferably carry out the communication operation in conformity to the while the backward compatibility with the conventional standard to which the space division multiple access is not applied is maintained, the new standard to which the space division multiple access is applied.

Also, according to the present invention, while the backward compatibility with the conventional standard is maintained, it is possible to provide the excellent communication apparatus and the communication method, the computer program, and the communication system in which it is possible to carry out the learning on the weight of the adaptive array antenna that becomes necessary to the space division multiple access.

According to the invention described in claims 1 and 9 to 11 of the present application, the communication apparatus that supplies the training signal can be applied to the communication environment where the surrounding station compliant with the first communication standard which is equivalent to the downward standard exists in a mixed manner, and by causing the above-mentioned surrounding station to perform the communication operation on the basis of the information described in the first field, it is possible to supply the training signal to the communication partner while the backward compatibility is maintained.

According to the invention described in claim 2 of the present application, as the training signal is composed of the unique known sequence allocated for each communication apparatus, the communication partner that receives the training signals at the same time from the plurality of communication apparatuses can spatially separate the plurality of training signals for each user.

According to the invention described in claims 3 and 4 of the present application, the training frame is provided with the header section having the backward compatibility with IEEE802.11, and also, in the L-SIG field in the header section, instead of the information representing the original frame length and transmission rate, Length and Rate information spoofed so that the data length÷the transmission rate becomes the period in which the NAV should be set (the transmission completion time point of the subsequent ACK frame) is stored. Even when the second field having no backward compatibility in the training frame cannot be decoded, the surrounding station compliant with the conventional IEEE802.11 refrains from the transmission operation over the unit of communication sequence performed by the relevant communication apparatus with the communication partner. Therefore, the communication apparatus can supply the training signal to the communication partner while the backward compatibility is maintained.

According to the invention described in claim 5 of the present application, the training frame is provided with the structure in which the training signal is added in the rear of the data frame of IEEE802.11. By referring to the duration defined at the beginning of the payload section of IEEE802.11 among the training frame and setting the counter value of the NAV, the surrounding station compliant with the conventional IEEE802.11 refrains from the transmission operation over the unit of communication sequence performed by the relevant communication apparatus with the communication partner. Therefore, the communication apparatus can supply the training signal to the communication partner while the backward compatibility is maintained. Also, as the Length in the L-SIG field is spoofed into the information representing up to the trailing end of the data frame as the data length of the payload section of the training frame, the surrounding station compliant with the conventional IEEE802.11 does not need to decode the second field having no backward compatibility in the training frame.

According to the invention described in claim 6 of the present application, while the no-transmission interval at the predetermined length is provided between the trailing end of the first field equivalent to the data frame and the second field composed of the training signal, as the surrounding station compliant with the conventional IEEE802.11 recognizes that the information of the L-SIG is correct as the reception power is decreased once as expected after the reception of the data frame, and the reception packet does not need to be discarded.

According to the invention described in claim 7 of the present application, the surrounding station refrains from the transmission operation over the unit of communication sequence performed by the relevant communication apparatus with the communication partner while the NAV information described in the duration is valid. Therefore, the communication apparatus according to the present invention can supply the training signal to the communication partner while the backward compatibility with the conventional standard is maintained.

According to the invention described in claim 8 of the present application, the structure equivalent to the data frame of IEEE802.11 is provided. By referring to the duration defined at the beginning of the payload section of IEEE802.11 among the training frame and setting the counter value of the NAV, the surrounding station compliant with the conventional IEEE802.11 can refrain from the transmission operation over the unit of communication sequence performed by the relevant communication apparatus with the communication partner. Therefore, the communication apparatus according to the present invention can supply the training signal to the communication partner while the backward compatibility with the conventional standard is maintained.

Further objects, features, and advantages of the present invention will become apparent from a more detailed description based on embodiments of the present invention which will be described below and the attached drawings.

DESCRIPTION OF EMBODIMENTS

Hereinafter, embodiments of the present invention will be described in detail with reference to the drawings.

Figure 1:
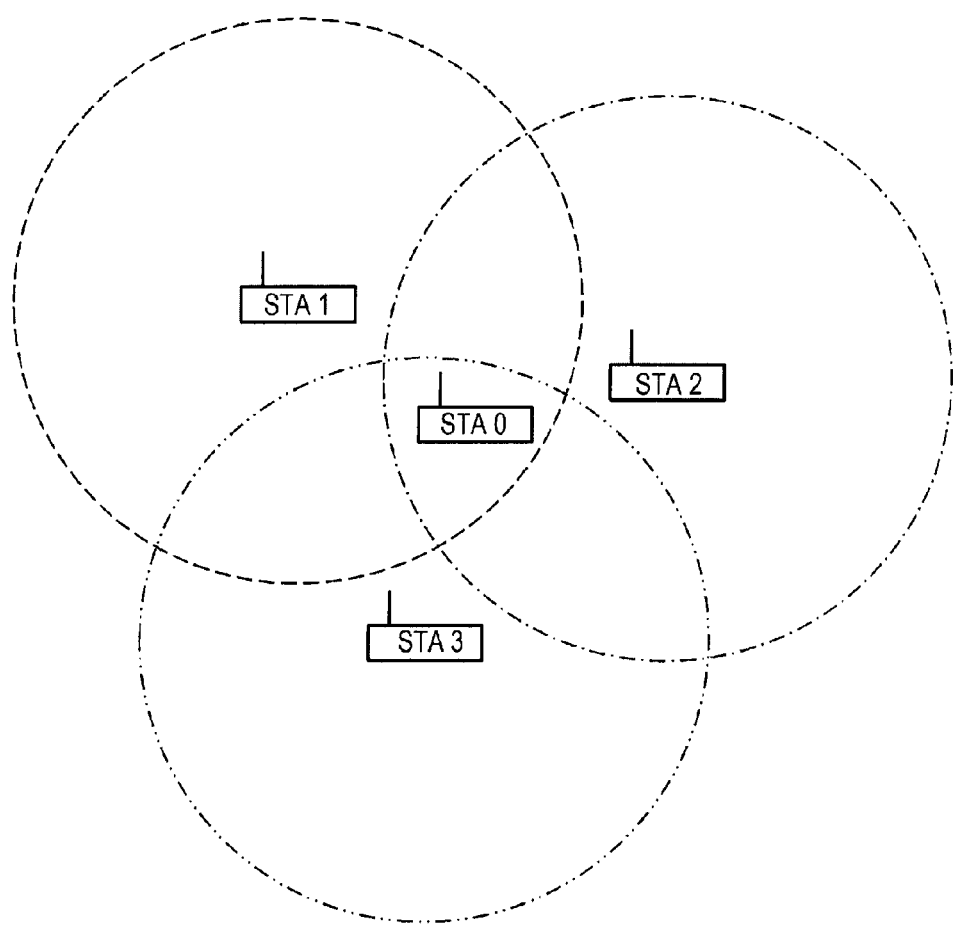
FIG. 1 schematically illustrates a configuration of a communication system according to one embodiment of the present invention.

FIG. 1 schematically illustrates a configuration of a communication system according to one embodiment of the present invention. The communication system according to the present embodiment is compliant, for example, with IEEE802.11 and is set to use the CSMA/CA control procedure in combination with the RTS/CTS handshake (described above).

The communication system illustrated in the drawing is composed of a communication station STA0 that operates as an access point (AP) and a plurality of communication stations STA1, STA2, and STA3 that operates as a terminal station (client device). The respective communication stations STA1, STA2, and STA3 contain the communication station STA0 in the respective communication areas and can respectively perform a direct communication with the STA0 (in other words, the respective communication stations STA1, STA2, and STA3 are placed under the control of the STA0 as the access point and constitute BBS (Basic Service Set)). It should be however noted that the respective communication stations STA1, STA2, and STA3 as the terminal stations do not necessarily need to exist within the mutual communication range, and a direct communication between the terminal stations will not be referred to below.

Herein, the STA0 as the access point is composed of the communication apparatus that performs a space division multiple access by an adaptive array antenna provided with a plurality of antennas and allocates a wireless resource on a spatial axis to a plurality of users to multiplex frame communications. That is, the STA0 is the communication apparatus compliant with a new standard such as IEEE802.11ac which performs a one-to-many frame communication by multiplexing two or more frames of which destination communication stations are different from each other on a same time axis and separating the frames of which destinations are the local station which are multiplexed and transmitted on the same time axis by the two or more communication stations for each transmission source. As the STA0 is equipped with more antennas, it is possible to increase the number of terminal stations that enables the spatial multiplexing. Of course, the STA0 may perform not only the one-to-many frame communication with the respective communication stations STA1, STA2, and STA3 by applying the space division multiple access but also a one-to-one frame communication with the respective communication stations STA1, STA2, and STA3 individually.

On the other hand, the communication stations STA1, STA2, and STA3 as the terminal stations are composed of the communication apparatuses that perform the space division multiple access by the adaptive array antenna provided with the plurality of antennas but performs a user separation only at the time of reception and does not perform the user separation at the time of transmission, that is, the multiplexing of the transmission frames, so that it is not necessary to equip with as many antennas as the access point. It should be noted that at least a part of the terminal stations placed under the control of the STAG as the access point (not illustrated in FIG. 1) may be a communication apparatus compliant with conventional standard such as IEEE802.11a. In other words, the communication system illustrated in FIG. 1 is a communication environment in which the communication station of the relevant new standard exists in a mixed manner with the communication station of the conventional standard.

Therefore, when the communication station STAG operates the space division multiple access as the access point, it is necessary to sufficiently take the backward compatibility with the conventional standard into account.

Figure 2:
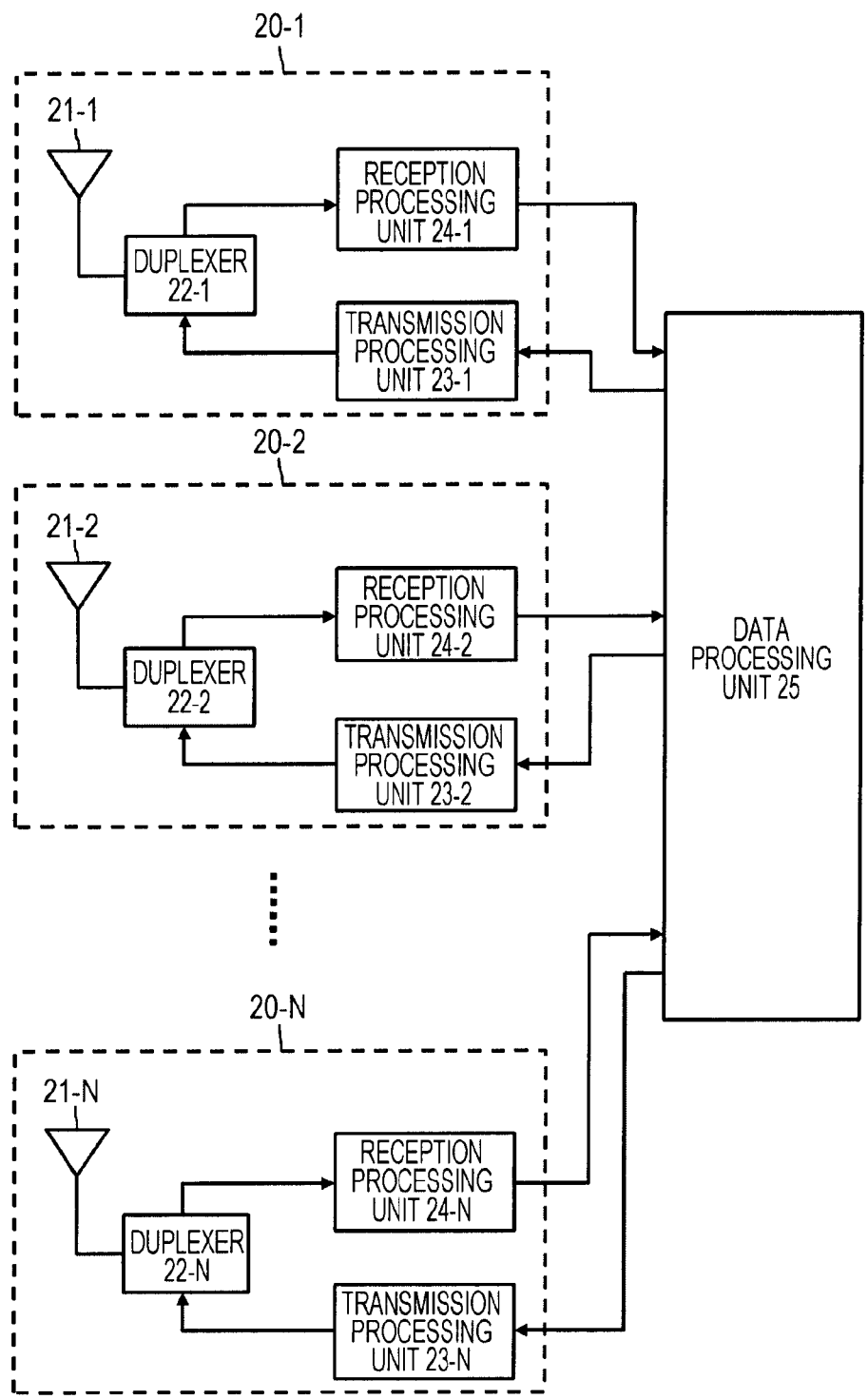
FIG. 2 illustrates a configuration example of a communication apparatus that can perform a multiplexing of a plurality of users by applying a space division multiple access.

FIG. 2 illustrates a configuration example of a communication apparatus that can perform a multiplexing of a plurality of users by applying the space division multiple access. In the communication system illustrated in FIG. 1, the communication station STA0 operating as the access point and one corresponding to the space division multiple access which is a part of the communication stations STA1 to STA3 operating as the terminal stations have the configuration illustrated in FIG. 2 and is set to perform a communication operation in conformity to the new standard.

The communication apparatus illustrated in the drawing is composed of N pieces of transmission reception branches 20-1, 20-2, . . . , 20-N respectively provided with the antenna elements 21-1, 21-2, . . . , 21-N and a data processing unit 25 that is connected to the respective transmission reception branches 20-1, 20-2, . . . , 20-N and performs a processing on transmission reception data (it should be however noted that N is an integer larger than or equal to 2). These plurality of antenna elements 21-1, 21-2, . . . , 21-N can function as an adaptive array antenna by applying an appropriate weight of the adaptive array antenna. The communication station STA0 as the access point performs the space division multiple access by the adaptive array antenna but can improve the number of terminal stations that can be contained through a multiple access by having many antenna elements.

In the respective transmission reception branches 20-1, 20-2, . . . , 20-N, the respective antenna elements 21-1, 21-2, . . . , 21-N are connected to transmission processing units 23-1, 23-2, . . . , 23-N and reception processing units 24-1, 24-2, . . . , 24-N via duplexers 22-1, 22-2, . . . , 22-N.

When transmission data is generated in accordance with the transmission request from an upper-layer application, the data processing unit 25 sorts out the transmission data to the respective transmission reception branches 20-1, 20-2, . . . , 20-N. Also, in a case where the communication apparatus is the STA0 operating as the access point, when the transmission data addressed to a plurality of users, that is, the respective communication stations STA1, STA2, and STA3 is generated in accordance with the transmission request from the upper-layer application, the data processing unit 25 multiplies a transmission weight of the adaptive array antenna for each transmission reception branch and performs a spatial separation on the transmission data to be thereafter sorted out to the respective transmission reception branches 20-1, 20-2, . . . , 20-N. It should be however noted that the "spatial separation" at the time of the transmission referred herein means only a user separation for the spatial separation for each user that transmits the frame at the same time.

The respective transmission processing units 23-1, 23-2, . . . , 23-N apply a predetermined signal processing such as encoding and modulation on digital baseband transmission signals supplied from the data processing unit 25, thereafter perform a D/A conversion, furthermore performs an up-convert to RF (Radio Frequency) signals, and perform a power amplification. Then, the above-mentioned transmission RF signals are supplied via the duplexers 22-1, 22-2, . . . , 22-N to the antenna elements 21-1, 21-2, . . . , 21-N and emitted into air.

Meanwhile, in the respective reception processing units 24-1, 24-2, . . . , 24-N, when the RF reception signals from the antenna elements 21-1, 21-2, . . . , 21-N are supplied via the duplexers 22-1, 22-2, . . . , 22-N, the RF reception signals are subjected to a low-noise amplification, then a down-convert to analog baseband signals, and thereafter a D/A conversion, and are further applied with predetermined signal processings such as decoding and demodulation.

The data processing unit 25 multiplies a reception weight of the adaptive array antenna with respect to the digital reception signals input from the respective reception processing units 24-1, 24-2, . . . , 24-N respectively to perform a spatial separation, and when the transmission data from each user, that is, each of the communication stations STA1, STA2, and STA3 is reproduced, passes the transmission data over to the upper-layer application. It should be however noted that the "spatial separation" at the time of the reception referred herein includes both meanings of a user separation for the spatial separation for each user that transmits the frames at the same time and a channel separation for separating the spatially multiplexed MIMO channel into the plurality of original steams.

When the frame transmission reception is carried out by the respective transmission reception branches 20-1, 20-2, ..., 20-N, the data processing unit 25 executes a processing on respective layers of a communication protocol in a media access control (Media Access Control: MAC) system mounted by the communication system illustrated in FIG. 1. Herein, to function the plurality of antenna elements 21-1, 21-2, ..., 21-N as the adaptive array antenna, the data processing unit 25 controls the respective transmission processing units 23-1, 23-2, ..., 23-N and the respective reception processing units 24-1, 24-2, ..., 24-N to apply the transmission weight of the adaptive array antenna on the transmission signals sorted out to the respective transmission reception branches 20-1, 20-2, ..., 20-N and also apply the reception weight of the adaptive array antenna on the reception signals from the respective transmission reception branches 20-1, 20-2, ..., 20-N. Also, prior to the space division multiple access with the respective communication stations STA1, STA2, and STA3, the data processing unit 25 learns the weight of the adaptive array antenna. For example, by using a predetermined adaptation algorithm such as RLS (Recursive Least Square) with respect to a training signal (which will be described below) that is composed of the known sequences received from the respective communication partners STA1 to STA3, it is possible to carry out the learning on the weight of the adaptive array antenna.

It should be noted that the communication stations STA1, STA2, and STA3 as the terminal stations perform the space division multiple access by the adaptive array antenna provided with the plurality of antennas, but the user separation is carried out only at the time of the reception and the user separation at the time of the transmission, that is, the multiplexing of the transmission frames is not carried out, so that it is not necessary to equip with as many antennas as the access point.

Figure 3:
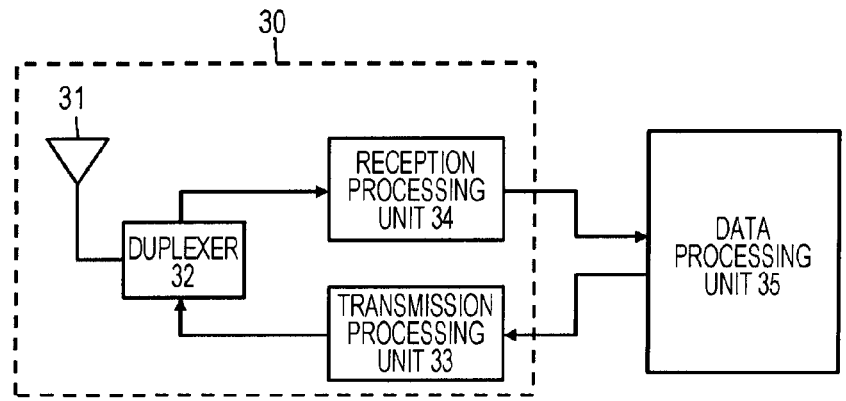
FIG. 3 illustrates a configuration example of a communication apparatus in compliant with a conventional standard such as IEEE802.11a without applying the space division multiple access.

Also, FIG. 3 illustrates a configuration example of a communication apparatus in compliant with the conventional standard such as IEEE802.11a without applying the space division multiple access. In the communication system illustrated in FIG. 1, among the terminal stations placed under the control of the STA0 as the access point, one that is provided with the configuration illustrated in FIG. 3 and performs a communication operation only in conformity to the conventional standard also exists (which is not illustrated in FIG. 1).

The communication apparatus illustrated in FIG. 3 is composed of a transmission reception branch 30 provided with an antenna element 31 and a data processing unit 35 that is connected to this transmission reception branch 30 and performs a processing on transmission reception data. Also, in the transmission reception branch 30, the antenna element 31 is connected to a transmission processing unit 33 and a reception processing unit 34 via a duplexer 32.

The data processing unit 35 generates transmission data in accordance with the transmission request from the upper-layer application to be output to the transmission reception branch 30. The transmission processing unit 33 applies a predetermined signal processing such as encoding and modulation on digital baseband transmission signals, thereafter performs a D/A conversion, further performs an up-convert to RF signals, and performs a power amplification. Then, the above-mentioned transmission RF signals are supplied via the duplexer 32 to the antenna element 31 and emitted into air.

Meanwhile, in the reception processing unit 34, when the RF reception signals from the antenna element 31 are supplied via the duplexer 32, N, the RF reception signals are subjected to a low-noise amplification, then a down-convert to analog baseband signals, and thereafter a D/A conversion, and are further applied with a predetermined signal processing such as decoding and demodulation. The data processing unit 35 reproduces the original transmission data from the digital reception signals input from the reception processing unit 34 to be passed over to the upper-layer application.

In the communication system illustrated in FIG. 1, the STA0 as the access point applies the weight of the adaptive array antenna with respect to the plurality of antenna elements 21-1, 21-2, ..., 21-N to function as the adaptive array antenna and can form a directivity with respect to the respective communication stations STA1 to STA3. As a result, the wireless resource on the spatial axis is separated for each user, and the plurality of frames addressed to the respective communication stations STA1 to STA3 can be multiplexed and transmitted at the same time. Also, as the STA0 functions as the adaptive array antenna, the respective frames transmitted at the same time from the respective communication stations STA1 to STA3 can be separated for each user on the spatial axis and subjected to a reception processing.

Herein, in order for the plurality of antenna elements 21-1, 21-2, ..., 21-N to function as the adaptive array antenna, it is necessary to previously perform the learning on the weight of the adaptive array antenna. For example, the STAG can learn the weight of the adaptive array antenna by obtaining the transfer function from the training signal composed of the known sequences respectively received from the respective communication stations STA1 to STA3. Alternatively, the STA0 uses the predetermined adaptation algorithm such as RLS (Recursive Least Square) with respect to the training signal received from each of the plurality of communication partners and can directly carry out the learning on the weight of the adaptive array antenna.

In either method, the STA0 that performs the learning on the weight of the adaptive array antenna needs the respective communication stations STA1 to STA3 to send the training signal. Also, under the communication environment where the communication apparatuses that only follow the conventional standard exist in a mixed manner, similarly as in a state in which the normal frame exchange sequence needs to be carried out while the collisions of the carriers are avoided, the training signal needs to be transmitted while the interference by the communication apparatuses that only follow the conventional standard is avoided. That is, the STA0 needs to perform the learning on the weight of the adaptive array antenna while the backward compatibility with the conventional standard is maintained.

Figure 4:
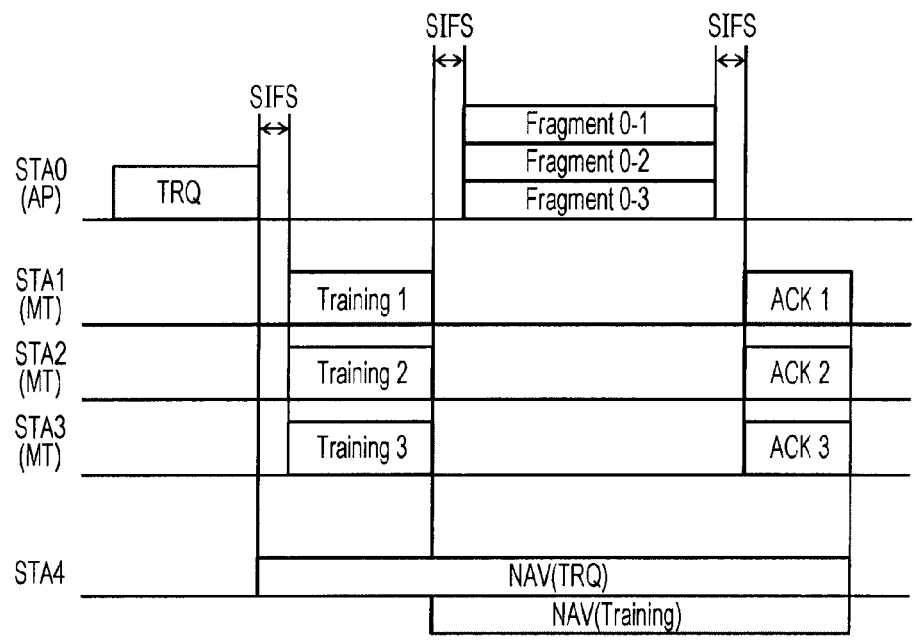
FIG. 4 illustrates a communication sequence example for learning a weight of an adaptive array antenna on the basis of a training signal.

FIG. 4 illustrates a communication sequence example for the weight of the adaptive array antenna on the basis of a training signal. In the example illustrated in the drawing, the communication station STA0 that performs the learning transmits a training request (TRQ: Training ReQuest) frame for requesting a transmission of the training signal, and the respective surrounding stations STA1 to STA3 receiving the TRQ frame respectively reply the training frame including the known sequence used for the learning. It should be noted that the communication station STA4 in FIG. 4 is not included in FIG. 1 but is a communication station that is only compliant with the conventional standard and is set as a hidden terminal existing within at least one of communication ranges of the communication stations STA0 to STA3.

The STA0 as the access point previously performs the physical carrier sense, checks that the media is clear, furthermore performs the back-off, and thereafter transmits the TRQ frame. At this time point, as the weight of the adaptive array antenna is not yet learnt (that is, the plurality of antenna elements 21-1, 21-2, ..., 21-N do not function as the adaptive array antenna, the TRQ frame is non-directionally transmitted.

The TRQ frame includes a field that follows IEEE802.11 that is the conventional standard, and duration information (which will be described below) for requesting a setting of the counter value of the NAV that is equivalent to a period until the series of signal transmission reception sequence is ended (in the example illustrated in the drawing the transmission of the ACK is completed) is described with respect to the communication station (hidden terminal) that is not the destination of the TRQ frame. A format of the TRQ frame will be described below instead.

The STA4 that follows the conventional standard sets the counter value of the NAV on the basis of the duration information described in the relevant frame in a case where the above-mentioned TRQ frame that does not include the local station in the destination is received and refrains from the transmission operation.

Also, according to the communication station arrangement illustrated in FIG. 1, the TRQ frame transmitted from the STA0 reaches the respective communication stations STA1 to STA3. In contrast to this, the respective communication stations STA1 to STA3 respectively reply the training frames including the known sequence (Training 1, Training 2, and Training 3) that can be used for the learning of the adaptive array antenna after the predetermined inter frame space SIFS (Short Inter Frame Space) elapses since the TRQ frame where the address of the local station is described in the destination address is received.

According to the present embodiment, to carry out the learning on the weight of the adaptive array antenna while the backward compatibility with the conventional standard is maintained, the training frame is composed of a field of a first half which follows IEEE802.11 that is the conventional standard and a field of a second half which has no downward compatibility with the conventional standard and includes the known sequence for the training. In the field of the first half which follows the conventional standard, as the surrounding station compliant with the conventional standard refrains from the transmission operation over a period until the series of signal transmission reception sequence is ended, it is misidentified that a description spoof (spoofing) is applied so that the relevant training frame continues until a time point when the transmission of the ACK is completed later. It should be however noted that the format of the training frame will be described below instead.

Also, in the example illustrated in FIG. 4, the respective communication stations STA1 to STA3 are set to transmit the training frames at the same time.

Herein, a method of transmitting the respective training frames through time division is also conceivable. However, if the time division transmission is carried out, the number of communication stations that reply the training frames (that is, the learning must be carried out) is increased and also a period until the transmission of all the training frames is ended (that is, a transmission standby period for the surrounding station) becomes long, which leads to a decrease in the throughput for the system as a whole and an increase in the overhead. Also, a possibility exists that the surrounding station (hidden terminal) that can only receive the training frames transmitted backward on the time axis may start the transmission operation as the counter value of the NAV vanishes before the training frames reach, and the collisions of the carriers cannot be avoided. Due to these reasons, according to the present embodiment, the training frames are transmitted at the same time.

Meanwhile, after the transmission of the TRQ frame is completed, the STA0 stands by to receive the training frames respectively replied from the respective destination stations STA1 to STA3 of the TRQ frame. At a time point when the training frames are received, as the learning of the adaptive array antenna is not carried out, it is necessary for the STA0 to receive the plurality of training frames at the same time by using one of the antenna elements. Herein, in a case where the following three conditions are satisfied, the STA0 can receive the field section having the downward compatibility at the first half among the simultaneously transmitted training fields while the collisions are avoided.

(1) Using an OFDM modulation system.
(2) Operating so that oscillators of the respective communication stations STA1, STA2, and STA3 correct a frequency error with an oscillator used by the STA0.
(3) Description contents in the relevant fields of the training frames transmitted by the respective communication stations STA1, STA2, and STA3 are all the same.

The OFDM modulation system in the condition (1) is known to be resilient to multipath fading. Also, the condition (2) can be satisfied while the respective communication stations STA1, STA2, and STA3 execute a frequency correction at the time of the reception of the TRQ frame from the STA0. By executing the frequency correction, a delay time at which the training frames simultaneously transmitted from the respective communication stations STA1, STA2, and STA3 reach the STA0 is guaranteed to be contained in a guard interval. Then, as exemplified in the condition (3), if the relevant fields of the respective communication stations STA1, STA2, and STA3 are the same description contents, these can be dealt with as a normal delayed wave similarly, and the simultaneous reception can be carried out by using one antenna element.

Also, among the training frames, with regard to the field of the second half which includes the known sequence for the training and has no downward compatibility with the conventional standard, the STA0 performs the reception by using the plurality of antenna elements 21-1, 21-2, ..., 21-N. By previously allocating respectively unique code sequences to the respective communication stations STA1, STA2, and STA3 as the known sequences for the training, the STA0 can spatially separate each of the sequences. It should be however noted that if the number of communication stations subjected to the multiple access through the space division is increased, as it is necessary to distinguish each of them, the known sequences naturally become longer.

Then, the STA0 learns the weight of the adaptive array antenna on the basis of the respective known sequences by using a predetermined adaptation algorithm such as RLS algorithm. After that, the plurality of antenna elements 21-1, 21-2, ..., 21-N that the STA0 has function as the adaptive array antenna, and the STA0 can perform the space division multiple access.

On the other hand, in a case where one of the above-mentioned training frames that do not include the local station in the destination (Training 1, Training 2, and Training 3) is received, the STA4 that follows only the conventional standard misidentifies that the training frames continues until the transmission end time point of the subsequent ACK frame by the spoofing and refrains from the transmission operation.

After the predetermined inter frame space SIFS elapses since the reception of the training frames from the respective communication stations STA1, STA2, and STA3 is completed, the STA0 respectively transmits the data frames (Fragment 0-1, Fragment 0-2, and Fragment 0-3) addressed to each of the respective communication stations STA1, STA2, and STA3. The STA0 can transmit these plurality of data frames at the same time through the space division multiplexing by utilizing the above-mentioned learnt weight of the adaptive array antenna.

In contrast to this, when the reception of the data frames (Fragment 0-1, Fragment 0-2, and Fragment 0-3) respectively addressed to the local station is completed, after the predetermined inter frame space SIFS elapses, the respective communication stations STA1, STA2, and STA3 reply ACK frames (ACK1, ACK2, and ACK3) at the same time.

The plurality of antenna elements 21-1, 21-2, . . . , 21-N of the STA0 already function as the adaptive antenna and can spatially separate the plurality of simultaneously received ACK frames (ACK1, ACK2, and ACK3) for each user. For example, addresses of the communication stations STA1, STA2, and STA3 are respectively described in the respective ACK frames as each of transmitter addresses, the STA0 can identify the transmission sources of the received respective ACK frames. Also, if the ACK frames also include the known sequences for the training, the STA0 can cause the learnt weight of the adaptive array antenna to adaptively follow an environment change on the basis of the known sequences included in the received respective ACK frames.

In a case where one of the above-mentioned data frames (Fragment 0-1, Fragment 0-2, and Fragment 0-3) which are not addressed to the local station is received, the STA4 that follows the conventional standard sets the counter value of the NAV on the basis of the duration information described in the frame and refrains from the transmission operation. Also, in a case where one of the above-mentioned ACK frames (ACK1, ACK2, and ACK3) which are not addressed to the local station is received, the STA4 that follows the conventional standard sets the counter value of the NAV on the basis of the duration information described in the frame and refrains from the transmission operation.

As is understood from the communication sequence exemplified in FIG. 4, the STA0 that performs the space division multiple access can preferably learn the weight of the adaptive array antenna and also, furthermore, after the learning, while the wireless resource on the spatial axis is shared by the plurality of users and the plurality of data frames addressed to the plurality of users are multiplexed and transmitted, can improve the throughput for one-to-many, that is, the plurality of users as a whole.

Figure 5:
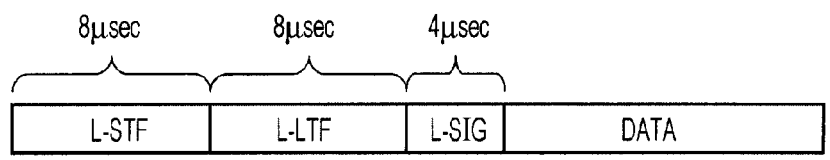
FIG. 5 illustrates a format example of a training request frame that can be used in the communication sequence illustrated in FIG. 4.

FIG. 5 illustrates a format example of a training request frame that can be used in the communication sequence illustrated in FIG. 4. The training frame illustrated in the drawing is composed of a header section and a payload section (DATA).

The header section of the training request frame is composed of an L-STF (Legacy Short Training Field) composed of a known OFDM symbol for finding the frame, an L-LTF (Legacy Long Training Field) composed of a known training symbol for synchronization acquisition and equalization, and an L-SIG (Legacy SIGNAL Field) in which the signal information such as a transmission rate and data length is described, and the payload section (Data) is transmitted while following this. The training frame can be composed in a format compliant with IEEE802.11 that is the conventional standard together with the header section and the payload section and can also be received by the surrounding station compliant only with the conventional standard.

Figure 6:
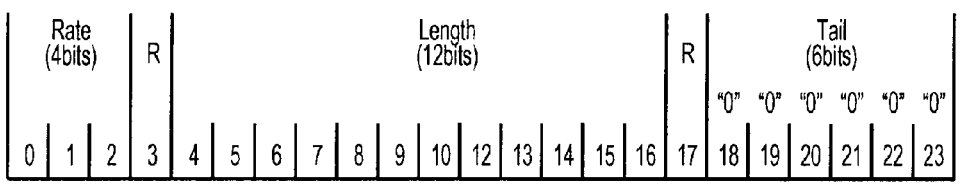
FIG. 6 illustrates a data structure of an L-SIG field.

FIG. 6 illustrates a data structure of an L-SIG field in the training request frame illustrated in FIG. 5. It should be noted that the format of the L-SIG field has a definition common to other frame format described below. In a Rate field, information representing the transmission rate used for the transmission of the payload section is described, and in a Length field, information representing the data length of the payload section is described. The communication station that receives the relevant frame can obtain a time up to the trailing end of the relevant frame by calculating the data length÷the transmission rate on the basis of the information which is identified by Rate and Length obtained by decoding the L-SIG.

Figure 7:
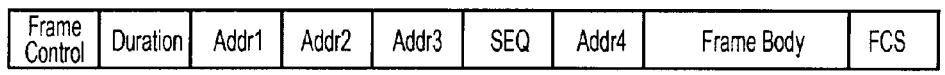
FIG. 7 illustrates a format example of a payload section (DATA) in the training request frame illustrated in FIG. 5.

FIG. 7 illustrates a format example of a payload section (DATA) in the training request frame illustrated in FIG. 5.

At the beginning of the payload section, a frame control (Frame Control) field and a duration (Duration) field are commonly defined. After that, a plurality of address fields Addr1 to 4, a sequence field (SEQ), a Frame Body which is actual information provided to the upper layer, and an FCS (Frame Check Sequence) which is a check sum follow.

The frame control has a further segmented format and, for example, various pieces of information such as a type of the relevant frame, a version of a protocol, the presence or absence of retransmission, and channel information for the data are described.

The duration is provided for carrying out a specification of a time. The respective communication stations that receive the relevant frame can grasp a time when the communication operation should be refrained on the basis of the time described in this duration in a case where the address of the local station is not described in the address fields Addr1 to 4. To be specific, in this duration, a counter value called NAV (Network Allocation Vector) is set. The counter value refers, for example, to a transmission completion time point for the subsequent ACK frame.

The plurality of address fields Addr1 to 4 are used for carrying out an identification on the transmission source, the destination communication station, and the like. In the case of the communication sequence example illustrated in FIG. 1, in the address fields, the respective addresses of the respective communication stations STA1 to STA3 that are the training request destinations are described.

The frame check sequence (FCS) is a 32-bit CRC (Cyclic Redundancy Check). For example, the destination station of the relevant frame recalculates this frame check sequence to check whether both are matched to each other. Then, in a case where it is not matched with the transmitted frame check sequence, while the frame is discarded as being regarded as destroyed, only a correct MAC (Media Access Control) frame is recognized, and the processing is carried out.

Figure 8:
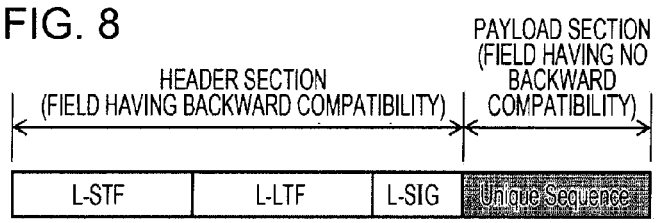
FIG. 8 illustrates a format example of a training frame used in the communication sequence illustrated in FIG. 4.

FIG. 8 illustrates a format example of a training frame used in the communication sequence illustrated in FIG. 4.

The training frame illustrated in the drawing is composed of the header section composed of the format compliant with IEEE802.11 that is the conventional standard (that is, having the downward compatibility) and the payload section that has no downward compatibility with the conventional standard.

The header section is composed of the L-STF, the L-LTF, and the L-SIG similarly as in the above-mentioned training request frame. In the communication sequence example illustrated in FIG. 4, the plurality of communication stations STA1 to STA3 transmit the training frames at the same time. The STA0 that is the training request source is in a state in which the learning of the adaptive array antenna is not carried out and needs to receive at the same time by using one antenna element. As the OFDM modulation system is used and the respective communication stations STA1 to STA3 that are the transmission sources of the training frames correct the frequency error and in addition, the description contents of the header section of the training frames transmitted by the respective communication stations STA1 to STA3 are the same, the STA0 can receive at the same time by using one antenna element.

Also, a data structure of the L-SIG field in the training frame is as illustrated in FIG. 6. In general, on the basis of the information identified by Rate and Length, by calculating the data length÷the data transmission rate, it is possible to obtain the time up to the trailing end of the relevant frame. In contrast to this, according to the spoofing technology, in the respective fields of Length and Rate in the header section, instead of the original information representing the frame length and the transmission rate, spoofed information is stored so that the data length÷the transmission rate becomes the period during which the NAV should be set (transmission completion time point of the subsequent ACK frame). Therefore, when the relevant frame is received, on the basis of the decoding result of the header section (L-SIG) having the downward compatibility, the surrounding station STA4 of the conventional standard stops the transmission operation for the appropriate period, and it is possible to avoid an interference with the communication sequence illustrated in FIG. 4. It should be noted that a state in which the payload section composed of the Unique Sequence follows the header section may be described in the L-SIG.

In the payload section, the known sequence for the learning is described. By previously allocating respectively unique code sequences (Unique Sequence) to the respective communication stations STA1, STA2, and STA3 as the known sequence for the training, the STA0 can spatially separate the respective sequences from the training frames to be simultaneously received (described above).

Figure 9A:
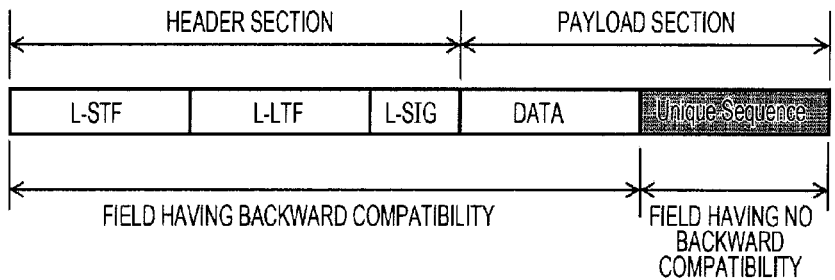
FIG. 9A illustrates another format example of the training frame used in the communication sequence illustrated in FIG. 4.

FIG. 9A illustrates another format example of the training frame used in the communication sequence illustrated in FIG. 4.

The training frame illustrated in the drawing is composed of the header section and the payload section. Similarly as in the above-mentioned training request frame, the header section is composed of the L-STF, the L-LTF, and the L-SIG, is compliant with IEEE802.11 that is the conventional standard, and has the downward compatibility. On the other hand, the payload section is composed of a DATA field having the downward compatibility and a Unique Sequence field having no downward compatibility. It is also possible to represent the training frame illustrated in the drawing as a configuration in which the Uniuqe Sequence field for the learning is added after the data frames regulated by IEEE802.11.

A data structure of the L-SIG field is as illustrated in FIG. 6 and includes the Length field in which the information representing the data length of the payload section is described. The data length of the payload section is a length obtained by combining the DATA field with the Unique Sequence field. It should be however noted that for the surrounding station compliant with the conventional standard, it is not necessary to decode the Unique Sequence field having no downward compatibility as the payload section. In view of the above, in the Length field, information where up to the trailing end of the DATA field having the downward compatibility is spoofed as the data length of the payload section while excluding the Unique Sequence field is described.

Similarly as in the format example illustrated in FIG. 7, in the DATA field, the frame control and the duration are commonly defined at the beginning. In the duration, the counter value of the NAV equivalent to the transmission completion time point of the subsequent ACK frame is set.

In the format example illustrated in FIG. 9A, the DATA field has the downward compatibility, and the surrounding station compliant with the conventional standard can grasp the time when the communication operation should be refrained on the basis of the duration described in the DATA field. For this reason, as being different from the format example as illustrated in FIG. 8, it is not necessary to spoof the Length and Rate fields in the L-SIG so that the frame length÷the transmission rate becomes the period during which the NAV should be set. Rather, the surrounding station should recognize that the NAV information described in the duration is valid. In view of the above, as described above, the Length field is spoofed into information representing up to the trailing end of the DATA field having the downward compatibility as the data length of the payload section while the Unique Sequence field is excluded.

The STA0 that is the training request source is in a state in which the learning of the adaptive array antenna is not carried out, and in order that the header section and the DATA field having the downward compatibility are received at the same time by using one antenna element, it is necessary for these sections to have the same description contents (same as above). The state in which the description contents of the header sections of the training frames transmitted by the respective communication stations STA1 to STA3 are the same is similar to the format example illustrated in FIG. 8. On the other hand, among the DATA field, the frame control and the duration commonly defined at the beginning have the same description contents in the training frames transmitted by the respective communication stations STA1 to STA3. Also, in a case where the address field is defined in the DATA frame, it is necessary to previously to make an arrangement between the respective communication stations STA1 to STA3 so that the same address information is described.

In the training frame illustrated in FIG. 9A, as described above, when the Length field in the L-SIG field is spoofed into the information representing up to the trailing end of the DATA field having the downward compatibility as the data length of the payload section, the surrounding station STA4 of the conventional standard does not need to decode the Unique Sequence field having no downward compatibility as the payload section. However, although it is expected that the reception power is decreased after the trailing end of the payload section, as illustrated in FIG. 9A, if the DATA field is connected seamlessly with the Unique Sequence field, the reception power that should be originally decreased continues as it is, and depending on the mounting of the surrounding station STA4, it is recognized that the information of the L-SIG has an error, so that a possibility exists that the whole packet is discarded, and the NAV may be invalidated.

Figure 9B:
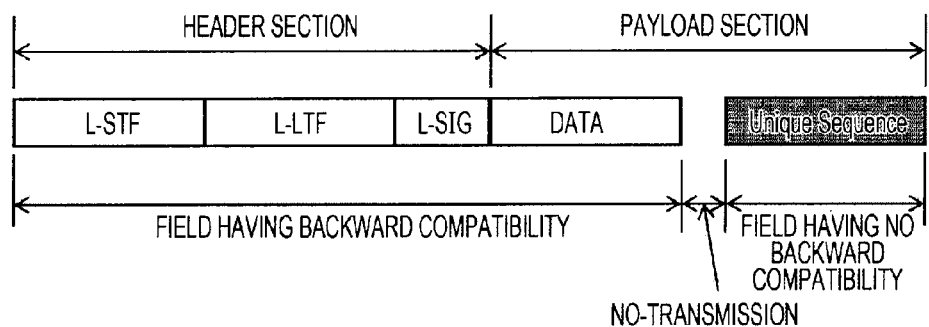
FIG. 9B illustrates still another format example of the training frame used in the communication sequence illustrated in FIG. 4.

As a solving method for this problem, as illustrated in FIG. 9B, the format of the training frame in which a no-transmission interval at a predetermined length is provided between the DATA field and the Unique Sequence field can be exemplified. In this case, as the reception power is decreased once as expected after the trailing end of the DATA field, the surrounding station STA4 of the conventional standard recognizes that the information of the L-SIG is correct and performs the setting of the NAV without discarding the reception packet. Therefore, the transmission source of the training frames can transmit the Unique Sequence field without problems after the no-transmission interval from the DATA field.

It should be noted that the interval length of the no-transmission interval may be, for example, a short interval such as SIFS (Short Inter Frame Space). Also, a state in which the Unique Sequence field follows thereafter may be described in the DATA field.

Figure 10:
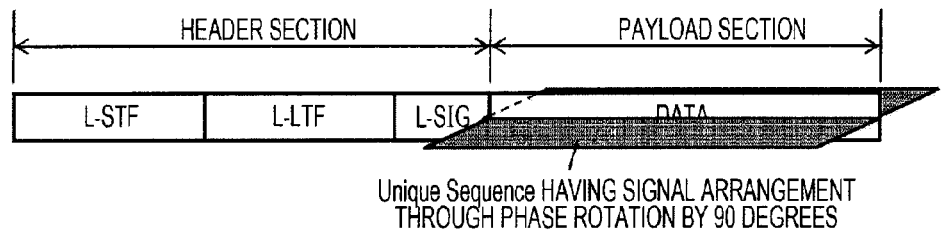
FIG. 10 illustrates a format example of the training frame used in the communication sequence illustrated in FIG. 4.

FIG. 10 illustrates still another format example of the training frame used in the communication sequence illustrated in FIG. 4. The training frame illustrated in the drawing is composed of the header section and the payload section (DATA).

Similarly as in the above-mentioned training request frame, the header section is compliant with IEEE802.11 that is the conventional standard composed of the L-STF, the L-LTF, and the L-SIG and has the downward compatibility.

Also, the payload section can be composed of a format compliant with IEEE802.11 that is the conventional standard and can adopt, for example, a data structure similar to that illustrated in FIG. 7.

The STA0 that is the training request source is in a state in which the learning of the adaptive array antenna is not carried out and needs to receive the header section and the payload section having the downward compatibility by using one antenna element. As the respective communication stations STA1 to STA3 have the same description contents of the header section and the payload section, the STA0 can receive at the same time by using one antenna element.

Also, in the example illustrated in FIG. 10, the known sequences for the learning are multiplexed on the payload section having the downward compatibility to be transmitted. It is also possible to mention that the training frame illustrated in the drawing is obtained by multiplexing the training signal on the payload section of the data frames regulated by IEEE802.11.

Figure 11A:
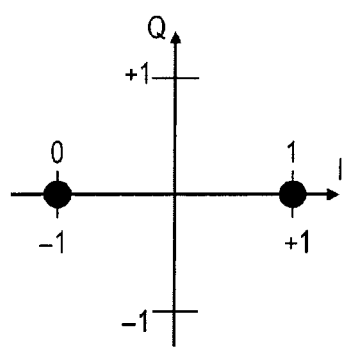
FIG. 11A is a diagram for describing an example of a method of multiplexing known sequences for learning in the payload section having the downward compatibility.
Figure 11B:
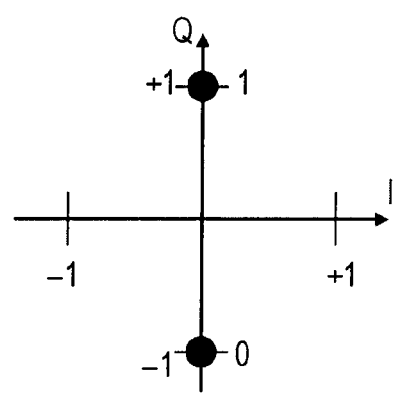
FIG. 11B is a diagram for describing an example of a method of multiplexing the known sequences for learning in the payload section having the downward compatibility.

As an example of a method of multiplexing the known sequence as the training signal on the payload section having the downward compatibility, a method of applying a digital modulation where a signal point arrangement is different from the original payload section is exemplified. FIG. 11 illustrates a multiplexing method in a case where BPSK (Binary Phase Shift Keying) is applied as a digital modulation system. That is, with regard to the original payload section, as illustrated in FIG. 11A, the signal arrangement is carried out as is conventionally done. In contrast to this, the known sequences for the learning are transmitted in a signal arrangement through a phase rotation by 90 degrees as illustrated in FIG. 11B. In this manner, by transmitting the information in a form in which the original payload section and the training signal are orthogonal to each other, while transmitting the NAV information placed on the original payload section with respect to the surrounding station STA4, the training signal for the learning can be transmitted to the destination station the STA0.

By previously allocating respectively unique code sequences (Unique Sequence) to the respective communication stations STA1, STA2, and STA3 as the known sequences for the training, the STA0 can spatially separate each of the multiplexed sequences from the payload sections of the training frames to be simultaneously received.

Figure 12:
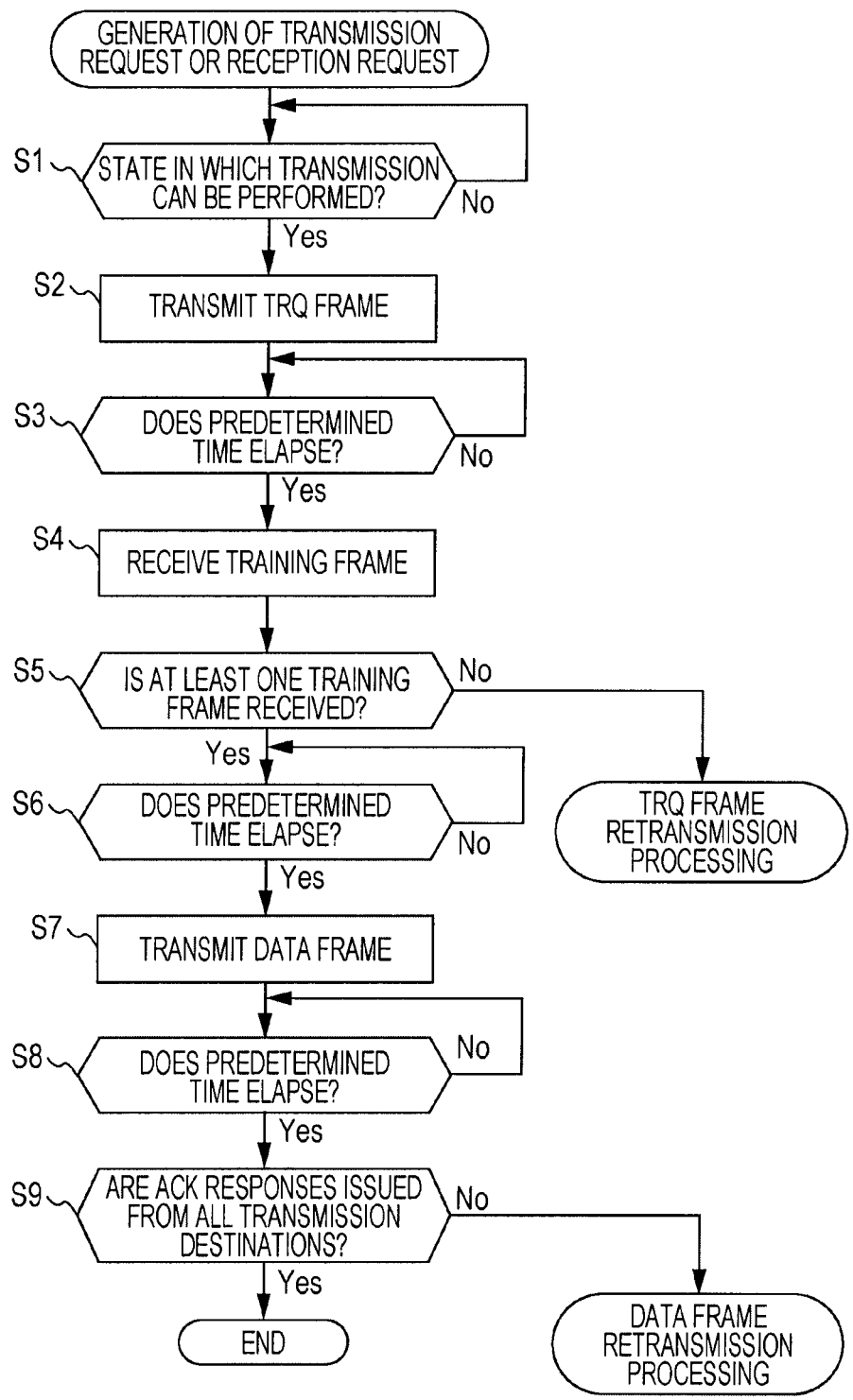
FIG. 12 is a flow chart illustrating a processing procedure for the communication apparatus illustrated in FIG. 2 to operate as an access point (STA0) in the communication sequence illustrated in FIG. 4.

FIG. 12 illustrates a processing procedure for the communication apparatus illustrated in FIG. 2 to operate as an access point (STA0) in the communication sequence illustrated in FIG. 4 in a format of a flow chart. The access point is set to start the processing procedure illustrated in FIG. 12, for example, in accordance with the generation of the data transmission request or reception request from the upper-layer application.

By previously performing the physical carrier sense to check that the media is clear and further performing the back-off and the like, when the local station is in a state in which the transmission can be carried out (Yes in step S1), the access point transmits the training request (TRQ) frame (see FIG. 5) to one or more terminal stations (STA1 to STA3) where the data is desired to be multiplexed and transmitted (step S2).

Then, when the predetermined inter frame space SIFS elapses since the transmission of the TRQ frame is completed (Yes in step S3), the access point stands by the reception of the training frames (see FIGS. 8 to 10) replied from the respective training request destinations (STA1 to STA3) (step S4).

Herein, when the training frames cannot be received from any of the training request destinations (STA1 to STA3) (No in step S5), the access point shifts to a retransmission processing of the TRQ frame. It should be however noted that a description on a detail of the frame retransmission processing procedure will be omitted.

Meanwhile, when the training frames can be received from any one or more of the training request destinations (STA1 to STA3) (Yes in step S5), the access point uses the known sequences for the learning respectively contained in the received training frames to learn the weight of the adaptive array antenna.

Then, when the predetermined inter frame space SIFS elapses since the reception of the training frames from the training request destinations is completed (STA1 to STA3) (Yes in step S6), the access point transmits the data frame to the terminal station where the training frame can be received (step S7).

At this time, by utilizing the learnt weight of the adaptive array antenna, the access point can transmit the data frames addressed to the plurality of terminal stations at the same time through the space division multiplexing. It should be however noted that with regard to the terminal station where the training frame cannot be received, as the learning is not carried out and also it is unknown in the first place that it exists in the communicable range, the transmission of the data frames is refrained.

Then, when the predetermined inter frame space SIFS elapses since the transmission of the data frames is completed (Yes in step S8), the access point stands by the reception of the ACK frames replied from the transmission destinations of the respective data frames (step S9).

When the ACK frames can be received from all the data frame transmission destinations (Yes in step S9), the access point can end the relevant processing routine successfully.

Meanwhile, when the ACK frame cannot be received from one of the data frame transmission destinations (No in step S9) or an NACK frame is received, the access point recognizes that the transmission and reception of the data frames is failed and executes the retransmission processing of the data frames. It should be however noted that the description on the detail of the frame retransmission processing procedure will be omitted.

It should be noted that as the communication procedure of the access point, instead of entering the reception standby of the training frames as it is after the TRQ frame is transmitted as described above, a method is also conceivable in which the processing is ended once when the TRQ frame is transmitted and the processing is resumed in accordance with the reception of the training frames. It should be however noted that in the latter case, a field for expressing it in the training frames is needed.

Figure 13:
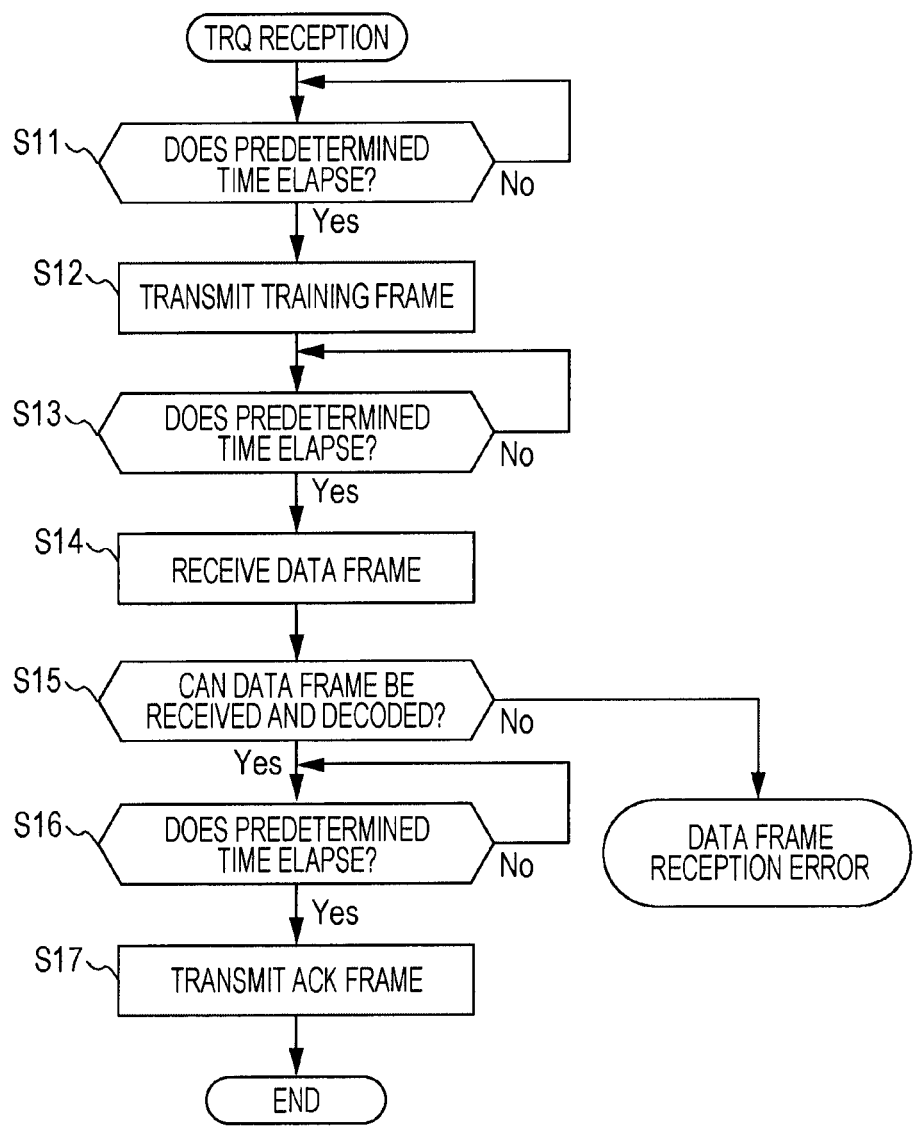
FIG. 13 is a flow chart illustrating a processing procedure for the communication apparatus illustrated in FIG. 2 or FIG. 3 to operate as a terminal station (one of STA1 to STA3) in the communication sequence illustrated in FIG. 4.

FIG. 13 illustrates a processing procedure for the communication apparatus illustrated in FIG. 2 or FIG. 3 to operate as a terminal station (one of STA1 to STA3) in the communication sequence illustrated in FIG. 4 in a format of a flow chart. Herein, the respective terminal stations are set to start the processing procedure illustrated in FIG. 13 in accordance with the reception of the TRQ frame from the access point. It should be however noted that the respective terminal stations executes a correction on the frequency error by using, for example, the L-LTF of the header section of the received TRQ frame, and the mutual clock errors are guaranteed to be contained in the guard interval.

After the predetermined inter frame space SIFS elapses since the reception of the TRQ frame from the access point is completed (Yes in step S11), the terminal station replies the training frames to the access point (step S12).

Herein, the terminal station executes the correction on the frequency error by using the received TRQ frame. Therefore, when the plurality of terminal station that reply the training frames exist, as the reaching time at the access point is guaranteed to be contained in the guard interval, the access point can receive at the time by using one antenna element.

Then, when the predetermined inter frame space SIFS elapses since the transmission of the training frames is completed (Yes in step S13), the terminal station stands by the reception of the data frame transmitted from the access point (step S14).

Herein, when the data frame cannot be received or the received data frame cannot be decoded because of the frame error or the like (No in step S15), the terminal station ends the relevant processing routine as it is regarded that the reception of the data frames is failed. Alternatively, the terminal station may reply the NACK for urging the retransmission of the data frames to the access point.

Meanwhile, when the data frame can be received from the access point (Yes in step S15), after the predetermined inter frame space SIFS elapses since the reception of the data frame is completed (Yes in step S16), the terminal station replies the ACK frame to the access point (step S17) and can end the relevant processing routine successfully.

While the STA0 as the access point and the STA1 to STA3 as the terminal station respectively execute the processing procedures illustrated in FIG. 12 and FIG. 13, the communication sequence illustrated in FIG. 4 is realized. Then, the STA0 that performs the space division multiple access can preferably learn the weight of the adaptive array antenna. When the TRQ frame and the training frame for the learning are exchanged, by applying the spoof on these frames (spoofing), it is possible to preferably avoid the collisions with the surrounding station that follows the conventional standard. Also, after the learning on the weight of the adaptive array antenna, while the wireless resource on the spatial axis is shared by the plurality of users and the plurality of data frames addressed to the plurality of users are multiplexed and transmitted, the STA0 can improve the throughput for one-to-many, that is, the plurality of users as a whole.

INDUSTRIAL APPLICABILITY

In the above, the present invention has been described in detail with reference to the specific embodiments. However, it is obvious that those skilled in the art may achieve modifications and alterations of the relevant embodiments without departing from the gist of the present invention.

According to the present specification, the embodiment applied to the new wireless LAN standard such as IEEE802.11ac that is aimed at the realization of the extra-high throughput of 1 Gbps has been mainly described, but the gist of the present invention is not limited to this. For example, the present invention can be similarly applied to other wireless LAN systems where the wireless resource on the spatial axis is shared by the plurality of users and various wireless systems other than the LAN.

To elaborate, the present invention has been described with reference to exemplary embodiments, and the described content of the present specification should not be construed in a limited manner. To determine the gist of the present invention, the scope of claims should be taken into account.

REFERENCE SIGNS LIST 20-1, 20-2, ..., 20-N TRANSMISSION RECEPTION BRANCH
21-1, 21-2, ..., 21-N ANTENNA ELEMENT
22-1, 22-2, ..., 22-N DUPLEXER
23-1, 23-2, ..., 23-N TRANSMISSION PROCESSING UNIT
24-1, 24-2, ..., 24-N RECEPTION PROCESSING UNIT
25 DATA PROCESSING UNIT
30 TRANSMISSION RECEPTION BRANCH
31 ANTENNA ELEMENT
32 DUPLEXER
33 TRANSMISSION PROCESSING UNIT
34 RECEPTION PROCESSING UNIT
35 DATA PROCESSING UNIT

The invention claimed is:

1. A communication apparatus comprising:
an antenna element;
a communication unit that performs a transmission and reception processing of a wireless signal by using the antenna element; and
one or more processors operable to generate a training frame composed of a first field described based on a first communication standard with a downward compatibility and a second field comprising a training signal for a communication partner provided with a plurality of antenna elements to learn a weight of an adaptive array antenna, the training frame to be transmitted from the communication unit,
wherein the training frame is obtained by multiplexing the training signal on a payload section of a data frame of the first field regulated by the first communication standard,
wherein the training signal comprising unique known sequences is transmitted in a signal arrangement through a phase rotation by 90 degrees such that information is transmitted in a form in which the payload section and the training signal are orthogonal to each other.

2. The communication apparatus according to claim 1, wherein the training signal is composed of the unique known sequences allocated to the communication apparatus.

3. The communication apparatus according to claim 1, wherein the first communication standard is equivalent to Institute of Electrical and Electronics Engineers (IEEE) 802.11, the first field of the training frame extends up to a Legacy Signal (L-SIG) field, and the second field is composed of the training signal added in a rear of the L-SIG field, and
wherein the one or more processors describe spoofed information in which a data length/a transmission rate represents a time up to a trailing end of a unit of a communication sequence with the communication partner in Length field and Rate field of the L-SIG field.

4. The communication apparatus according to claim 1, wherein the one or more processors describe a state in which the second field follows the first field in a Legacy Signal (L-SIG) field.

5. The communication apparatus according to claim 1, wherein the first field of the training frame is equivalent to the data frame regulated by Institute of Electrical and Electronics Engineers (IEEE) 802.11 of the first communication standard, and the second field is composed of the training signal added in a rear of the data frame, and wherein the one or more processors spoof Length field in a Legacy Signal (L-SIG) into information representing up to a trailing end of the data frame as a data length of a payload section of the training frame.

6. The communication apparatus according to claim 5, wherein the one or more processors generate the training frame having a no-transmission interval for separating a trailing end of the first field from a beginning of the second field.

7. The communication apparatus according to claim 5, wherein the one or more processors spoof Length field in a Legacy Signal (L-SIG) field into information representing up to a trailing end of the first field as the data length of the payload section of the training frame.

8. The communication apparatus according to claim 1, wherein the first field of the training frame is equivalent to a data frame regulated by Institute of Electrical and Electronics Engineers (IEEE) 802.11 of the first communication standard, and the second field is composed of training signals multiplexed on the payload section of the data frame.

9. The communication apparatus according to claim 1, wherein the one or more processors:
receive a training request (TRQ) frame prior to generating the training signal; and
execute a frequency correction with respect to the communication partner at a time of reception of the TRQ frame from the communication partner,
wherein the execution of the frequency correction introduces a delay time by which the training frame transmitted from the one or more processors reaching the communication partner is contained in a guard interval.

10. The communication apparatus according to claim 1, wherein the communication partner performs a physical carrier sense, determines whether a communication medium is clear and performs a back-off, and thereafter transmits a training request (TRQ) frame.

11. The communication apparatus according to claim 1, wherein the one or more processors:
receive a training request (TRQ) frame prior to generating the training signal; and
execute a frequency correction with respect to the communication partner at a time of reception of the TRQ frame from the communication partner,
wherein the frequency correction is executed using Legacy Long Training Field (L-LTF) contained in a header section of the TRQ frame.

12. A communication method comprising:
in a communication apparatus comprising one or more processors:
transmitting a first field described based on a first communication standard having a downward compatibility as part of the training frame to a communication partner provided with a plurality of antenna elements; and
transmitting a second field including a training signal for the communication partner to learn a weight of an adaptive array antenna as part of the training frame, wherein the training frame is obtained by multiplexing the training signal on a payload section of a data frame of the first field regulated by the first communication standard,
wherein the training signal comprising unique known sequences is transmitted in a signal arrangement through a phase rotation by 90 degrees such that information is transmitted in a form in which the payload section and the training signal are orthogonal to each other.

13. A non-transitory computer-readable storage medium having stored thereon, a computer program having at least one code section for communication, the at least one code section being executable by a computer for causing the computer to perform steps comprising:
in a communication apparatus operable to transmit a training frame to a communication partner provided with a plurality of antenna elements:
generating a training frame composed of a first field described based on a first communication standard having a downward compatibility and a second field comprising a training signal for the communication partner to learn a weight of an adaptive array antenna,
wherein the training frame is obtained by multiplexing the training signal on a payload section of a data frame of the first field regulated by the first communication standard,
wherein the training signal comprising unique known sequences is transmitted in a signal arrangement through a phase rotation by 90 degrees such that information is transmitted in a form in which the payload section and the training signal are orthogonal to each other.

14. A communication system comprising:
a first communication apparatus comprising a plurality of antenna elements, a communication unit that performs a transmission and reception processing of a wireless signal by using the plurality of antenna elements, and one or more processors operable to process data transmitted and received by the communication unit; and
a plurality of second communication apparatuses that simultaneously transmit training frames comprising a training signal for learning a weight of an adaptive array antenna with regard to the plurality of antenna elements to the first communication apparatus,
wherein each of the training frames is composed of a first field described based on a first communication standard having a downward compatibility and a second field comprising a training signal for the first communication apparatus to learn the weight of the adaptive array antenna,
wherein each of the training frames is transmitted such that the training signal is orthogonal to a payload section of the first field,
wherein the training signal comprising unique known sequences is transmitted in a signal arrangement through a phase rotation by 90 degrees such that information is transmitted in a form in which the payload section and the training signal are orthogonal to each other.

* * * * *